July 6, 1971 P. J. NEUSPIEL 3,591,492
SEWAGE TREATMENT PROCESS AND APPARATUS
Filed May 8, 1970 3 Sheets-Sheet 1

INVENTOR
Peter J. Neuspiel
BY Dressler, Goldsmith, Clement & Gordon
ATTORNEYS

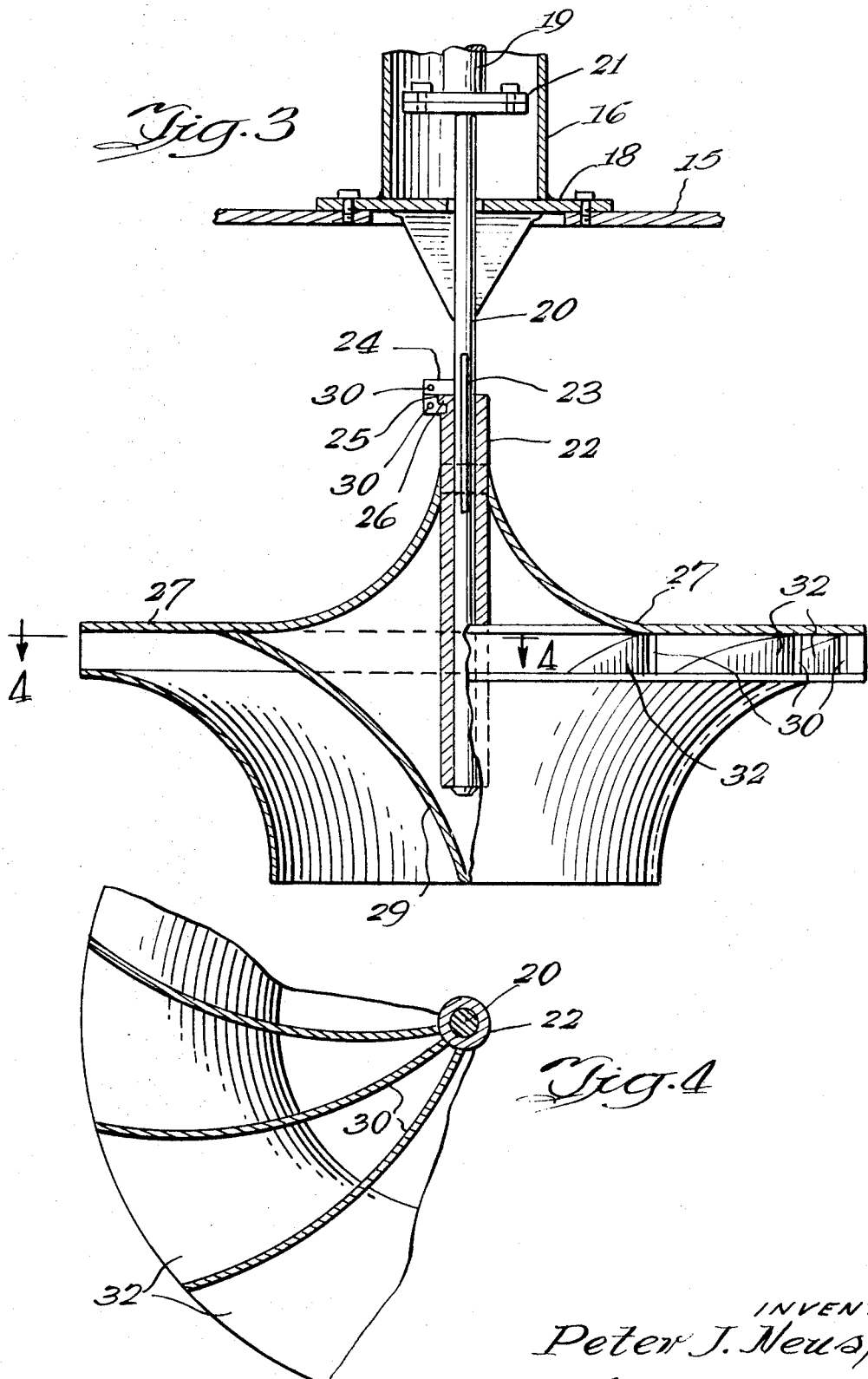

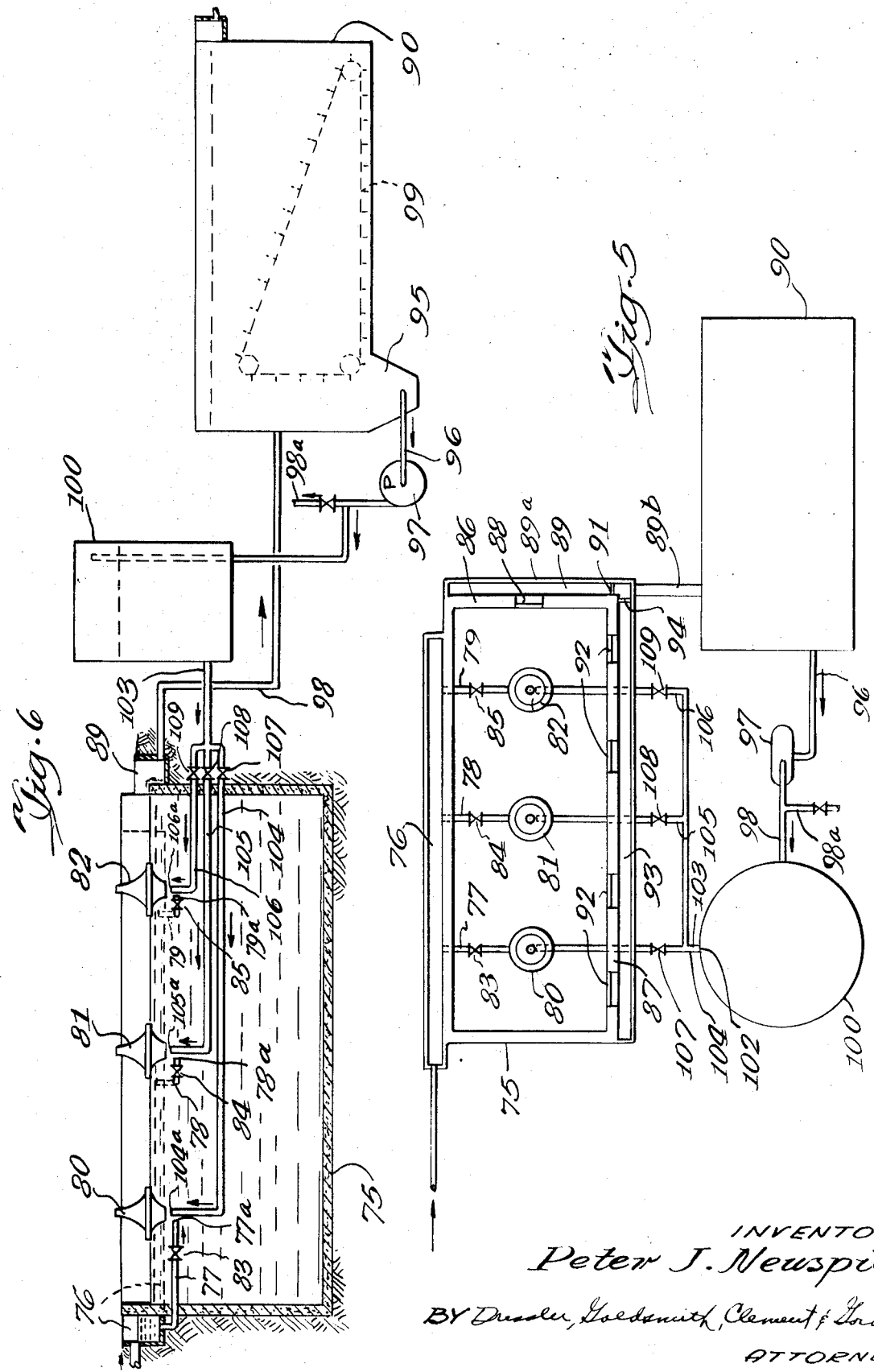

United States Patent Office 3,591,492
Patented July 6, 1971

3,591,492
SEWAGE TREATMENT PROCESS AND
APPARATUS
Peter J. Neuspiel, Chicago, Ill., assignor to
FMC Corporation
Continuation-in-part of application Ser. No. 779,721,
Nov. 29, 1968. This application May 8, 1970, Ser.
No. 35,613
Int. Cl. B01d 21/04; C02c 1/10
U.S. Cl. 210—7
16 Claims

ABSTRACT OF THE DISCLOSURE

The process of this invention deals with the aerobic treatment of sewage wherein a surface type aerator mixes the tank contents and incorporates air into the mixed liquor so that microorganisms may effectively remove biochemical oxygen demand and sludge is returned from the settling zone to the aeration zone by delivery to a holding zone from which it flows, as by gravity, to an outlet positioned adjacent the intake of the surface type aerator at which point it mixes with influent sewage. In the preferred embodiment, the apparatus comprises an aeration tank, a surface type aerator, a settling tank, a sludge removal means, a holding tank adapted to receive sludge discharged from the settling tank, conduit means for transfer of sludge from the holding tank to the vicinity of the aerator intake, said holding tank being elevationally positioned so that flow of sludge through the conduit means is at least in part a gravity flow.

---

This application is a continuation-in-part of my co-pending application Ser. No. 779,721, filed Nov. 29, 1968, now abandoned, entitled Sewage Treatment Process and Apparatus.

This invention relates to an aerobic process for the treatment of waste materials. More particularly, it relates to an activated sludge type process for treating sewage wherein influent sewage and recycle sludge are aerated by a mechanical "surface aerator" and the recycle sludge is moved from the settling zone to a holding zone and flows to the aeration zone from the holding zone by gravity or by a combination of gravity and a low lift effect produced by the mechanical surface aerator and apparatus for carrying out the process.

Briefly, the biological process of the present invention involves steps wherein a mixed liquor is established in an aeration zone, liquor in this zone has oxygen dispersed therein by the action of one or more surface aerators, influent sewage and recycle sludge are introduced into the aeration zone in close proximity to the intake of the aerator so that there may be continuous and complete mixing concurrent with dispersion of air in the mixture. Liquid medium withdrawn from the accumulation zone is settled to form a sludge concentrate. Sludge concentrate is withdrawn to a holding zone where a hydraulic head is maintained so that sludge moves at least partially in response to gravity to an outlet in the vicinity of the intake of the mechanical aerator.

DESCRIPTION OF PRIOR ART

In conventional activated sludge systems, sewage is subjected to screening, degritting operations, etc., following which the sewage is mixed with sludge returned from a settling zone and the mixture subjected in a so-called aeration zone to aeration during which oxygen, generally in the form of dispersed air bubbles, is introduced by aeration devices and dissolved according to the oxygen absorption characteristics of the liquid. Mixed liquor withdrawn from the aeration zone passes to a settling zone where the activated sludge is separated from a clarified effluent and returned to the aeration zone.

One of the problems encountered processwise in conventional activated sludge sewage treatment plants is limited flexibility in plant volumes which can be effectively yet economically handled. As the size of large conventional sewage treatment plants is reduced, the cost per unit of volume which can be processed, increases disproportionately to the size change and operating efficiencies may be reduced. This has resulted in considerable variation in plant layouts between large and small plants.

Another of the problems encountered in the conventional activated sludge sewage treatment plants is that a mixture of influent sewage and recycle sludge, a mixture having the greatest oxygen demand, is continuously added to the aeration tank mixed liquor causing the dissolved oxygen to be depleted in the vicinity of the inlet and, therefore, the period of time required for removal of Biochemical Oxygen Demand (B.O.D.) is increased while the diluted mixture circulates and makes contact with an adequate supply of oxygen.

The invention hereof comprises an improvement on or constitutes an improvement over such a system, because it adapts essential equipment to service in combinations resulting in simplified operations.

BRIEF SUMMARY OF THE INVENTION

Now, it has been discovered that purification of the waste materials being processed by an aerobic system can have the effectiveness enhanced by prompt return of sludge, i.e., by return of sludge which is available for removal from the settling tank as a sludge concentrate and has not been in the final settled stage for a long period, and arranging for movement of the sludge to a discharge point within the aeration zone adjacent the intake to a surface aerator whereby the sludge, influent sewage and mixed liquor in said zone are taken up and completely mixed concurrently with introduction of air.

The process involves a combination of operations in aeration and settling zones operated under very specific inter-related conditions. The aeration operation is one wherein agitation is arranged to accomplish rapid mixing of sewage, recycle sludge and mixed liquor and dissemination of necessary oxygen in the mixture while at the condition for optimum response to aeration, namely, immediately after contacting influent sewage with biologically active sludge.

In its broad aspects, the process for treating waste materials comprises establishing a mixed liquor in an aeration zone, dispersing oxygen in the contents of the aeration zone by the action of a surface aerator adapted to mix atmospheric air into liquid entering said aerator from below through a substantially axial inlet and discharge the mixture in a radial direction, introducing influent waste material in the vicinity of an elevationally below said axial inlet, discharging mixed liquor containing sludge solids to a solids separation zone, concentrating said setting sludge solids, removing sludge solids from said separation zone and introducing said solids into a holding zone wherein the liquid level maintained may be an elevation creative of a hydraulic head for movement of sludge from said holding zone to the aeration zone, flowing solids from said holding zone at least partially in response to gravity to an area in the vicinity of an elevationally below said rotor inlet whereby influent waste material and sludge immediately enter said rotor for mixing and aerating and discharging clarified effluent from the separation zone.

Although the combination of an aeration chamber and a clarification or settling chamber has been employed in the past for sewage treating purposes, the unique compact arrangement of the components of the apparatus of this invention enables utilization of a basic design for a wide range of sewage flow volumes to be accommodated and substantially automatic operation for extended periods of time in a single combination of aeration tank, holding tank and final tank which can be adapted by the use of controls on the influent and recycle streams to operate as a conventional activated sludge process and modifications thereof known as stepped aeration process, complete mixing process and contact stabilization process.

In one embodiment, the apparatus of this invention comprises an aeration tank, a rotor for introducing air into liquid passing therethrough which in use is at least partially submerged in the liquid in said tank and revolves about a substantially vertical axis, said rotor having a number of guide channels for the liquid formed between vanes curved in their vertical plane so as to deflect liquid entering the rotor from below through a substantially axial inlet outwards in a substantially horizontal direction, conduit means for directing influent sewage to an area in the vicinity of and elevationally below the inlet to said rotor, a sludge separation tank, liquid flow transfer means connecting said aeration tank to said sludge separation tank, means for collecting sludge settled by gravity to the separation tank bottom and transferring said sludge into a sludge accumulation channel, means for discharging clarified liquid from said separation tank, piping means communicating with the bottom of said sludge channel for directing flow of sludge accumulated in said channel to an area in the vicinity of an elevationally below the inlet to said rotor.

More in detail, the apparatus of this invention for aerating and circulating liquid in the aeration tank or the like comprises a rotor or vaned turbine which in use is at least partially submerged in the liquid and is rotated about a substantially vertical axis. The vanes are arranged to induce liquid to enter from the underside of the rotor, to incorporate air into the liquid passing through the rotor and to discharge liquid laterally or substantially horizontally by centrifugal force. Influent sewage enters the aeration tank through a conduit having an outlet in the vicinity of the intake of the rotor.

Mixed liquor discharged from the aeration tank is introduced into the settling zone operating for short term solids concentration. A preferred form of settling tank is one having a hoppered bottom wherein sludge solids settle by gravity substantially uniformly due to uniform distribution of incoming material.

In such a settling tank the most settled layer of sludge, i.e., sludge adjacent the floor of the hoppered bottom of the tank, is removed progressively and sequentially by a pick up with an exhaust unit which in each periodic cycle moves to positions adjacent various portions of the tank bottom so that eventually it traverses the entire bottom of the settling tank and limits the sludge accumulated at the bottom to a maximum residence time as settled sludge of less than 30 minutes.

A clarified effluent is withdrawn from the upper portion of the settling tank for discharge from the system.

The removed sludge solids concentrate is delivered to a holding zone or channel. A portion of the sludge is discharged from the system and the balance of the sludge is delivered to the aeration tank. Delivery of sludge is made through a conduit or pipe having an outlet in close proximity to the point of introduction of influent sewage.

Sludge flow through the conduit or channel may be by gravity, by induced flow or a combination thereof depending upon the elevation of the liquid level maintained therein relative to the liquid level being maintained in the settling tank or the aeration tank.

In an embodiment which provides means for flexibility in processing, the apparatus comprises an aeration tank, a plurality of surface aerators spaced longitudinally in said aeration tank, individual conduit means for directing influent sewage from a common source to an area in the vicinity of and elevationally below the inlet to each of said surface aerators, liquid flow control means associated with said individual conduit means, a sludge separation tank, liquid flow transfer means connecting said aeration tank to said sludge separation tank, means for collecting sludge concentrated in said separation tank and transferring said sludge concentrate to a holding tank, the liquid level in which is maintained at an elevational level creating a hydraulic head for movement of sludge concentrate to said aeration tank, means for discharging clarified liquid from said separation tank, means communicating with said holding tank for directing flow of sludge concentrate to an area in the vicinity of and elevationally below the inlet to each of said surface aerators and liquid flow control means associated with said means for directing flow of said sludge concentrate.

The elevation of liquid in the sludge channel may be more or less than the liquid elevation in the settling tank or in the aeration tank, depending upon whether an exhaust unit is provided with means such as an airlift capable of transferring the sludge to a point elevationally higher than the level in either tank. If the elevation in the channel is higher than in the aeration tank, sludge may be returned to the aeration tank by gravity and the outlet from the sludge channel need not be positioned close enough to the intake of the mechanical aerator so as to be within the area wherein the aerator is effective as a low lift pumping device. On the other hand, if the liquid elevation in the sludge channel is less than in the aeration tank, then the outlet must be positioned so that the mechanical aerator will provide some pumping action, i.e., the liquid head differential for movement of sludge. If the liquid elevation in the sludge channel is maintained below the liquid level elevation in the settling tank, sludge may be moved from the settling compartment to the sludge channel as by a siphon. The advantage of this sludge handling arrangement is that any necessary pumping within the system can be accomplished through the action of the mechanical aerator.

The invention will be further understood from the following description of embodiments of the invention taken in conjunction with the accompanying drawings in which:

FIG. 3 is a partial view showing internal structure of the rotor;

FIG. 4 is a partial sectional view along the line 4—4 of FIG. 3;

FIG. 5 is a top plan view of a combination of aeration tank with surface aerators, a settling tank and a holding tank providing flexibility in type of sewage treatment; and FIG. 6 is a developed diagrammatic elevational view showing the total system.

Figure 1:
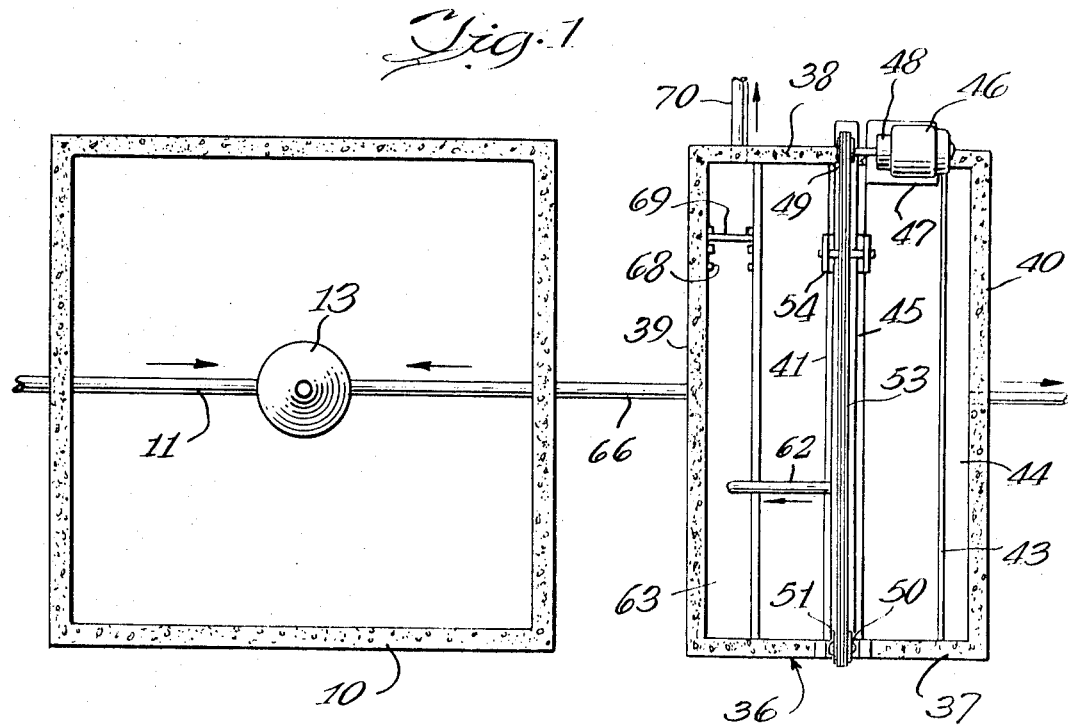
FIG. 1 is a top plan view of the apparatus.

In the drawings 1 through 4, which is the preferred embodiment, the numeral 10 indicates a tank of suitable material of construction. Sewage is introduced into tank 10 through inlet pipe 11 whose outlet 12 is positioned below a surface aerator 13.

Surface aerator 13 consists of a rotor or turbine-like wheel 14 mounted on a rotatable shaft which is driven by a source of power such as an electric motor, and is suspended by a suitable support member 15 so that said partially submerged rotor has the axial inlet thereto positioned in close proximity to the surface of the liquid in said aeration tank. To the motor frame 16 is fitted a base plate 18 which is bolted to the support member 15. The motor shaft 19 supports the rotor shaft 20 by a connecting flange 21.

The rotor, as is illustrated in more detail in FIG. 3, comprises a hub 22 for mounting onto the shaft 20, the hub 22 keywayed to take a key 23 on the shaft 20 for transmitting the rotation of the shaft to the rotor. The rotor is secured to the shaft by means of a split collar 24 having an inner annulus 25 to take a flange 26 on the hub 22. On the split collar 24, bolts 30 retensibly secure the rotor 14 and the hub 22 to shaft 20.

Hub 22 is secured to the rotor by welding. Upper circular cover plate 27 of the rotor is welded to hub 22. Cover plate 27 has securely attached thereto an outer curved disc member 28 and an inner cone-shaped member 29 with a plurality of vanes 30 positioned between the members 28 and 29. The vanes 30 divide the space formed between the members 28 and 29 into a number of guide channels 32 for the liquid entering the lower end of the rotor in a vertical direction into the guide channels which are arranged circularly around the shaft 20, the liquid then being deflected outwardly and discharged from the guide channels 32 at the outer perimeter of the rotor in a horizontal direction.

When such a rotor operates with the space between cover plate 27 and outer curved disc member 28 in a partially submerged condition, air is dispersed in the liquid passing through guide channels 32. If desired, auxiliary passages may be provided so that atmospheric air can reach the guide channels 32, for example, by provision of a tube adjacent the shaft 20 which is open ended above the normal water level and connects at its lower end with the guide channels through suitable apertures.

Influent sewage enters the tank 10 through inlet piping 11. Aerated mixed liquor is discharged from tank 10 to separation tank 36 through conduit 35.

Separation tank 36 is provided with end walls 37 and 38 and the sidewalls 39 and 40. Sidewalls 39 and 40 and their sloping portions 39a and 40a define a hoppered bottom terminating in a flat floor or solids accumulation area 41. Adjacent the wall 39 and spaced therefrom a distance determinable by the average volume flow and the maximum velocity desired is a baffle 42.

Wall 40 is adapted with an overflow weir 43 or suitable ports which liquid flow directing means admit clarified effluent to a channel 44 that conducts effluent to a suitable receiving body. End walls 37 and 38 support a beam member 45. A power source, such as an electric motor 46 is secured and supported on a bracket 47 which is fixed to and supported by one end of beam member 45. Also supported on bracket 47 is a conventional gear reduction unit 48. The drive shaft of the motor 46 is connected by a suitable coupling to the input shaft of the gear reduction unit so as to drive an output shaft upon which is mounted a sprocket wheel 49.

Beam member 45 has mounted thereon a bearing assembly 50 in which is journaled a shaft having splined thereto an idler sprocket wheel 51. An endless chain 53 is trained over the sprocket wheels 49 and 51 and has the ends thereof pivotally connected to a pin supported by a trolley 54. Electric motor 46, which drives chain 53 may be of the reversing type whose movement in each direction is controlled by limit switches, but, if desired, mechanical means for periodic reversal of direction of movement of chain 53 may also be used.

Trolley 54 includes a U-shaped frame 55 having a bottom 56 which is disposed beneath the beam member 45. Trolley 54 supports axles on which are mounted support flange wheels. The flanged wheels rest upon the bottom flange of the beam member 45. Thus, the trolley is supported for free travel above the open top of tank 10.

A pump 57 of a conventional airlift type is supported by trolley 54 in a position suspended below the beam member 45. The pump 57 includes an elongated conduit 58. Elongated conduit 58 has a foot piece 59 at the lower end thereof positioned adjacent the floor of the settling tank 40. Foot piece 59 has an inlet port in the form of a slot in the bottom thereof.

Intermediate its ends elongated conduit 58 is provided with a coupling 60. A port extends through the coupling 60 and communicates with the interior of conduit 58. A hose 61 leads upwardly from the coupling 60 and connects with a conventional source of compressed air not shown which is positioned externally of the tank 46 for supplying the air for operating pump 57 to create a suction. The conduit 58 includes an outlet branch 62 which is illustrated as discharging into the sludge accumulating channel 63.

Channel 63 is adapted with a constricted area 64, the lowermost point of which is adapated with a liquid outlet 65. A conduit 66 is adapted to deliver sludge concentrate from channel 63 to tank 10 through outlet 67. Channel 63 is also provided with means for wasting sludge consisting of spaced slot adjustment lugs 68, adapted to hold an adjustable gate 69 in vertical position. Sludge discharged into the trough on one side of the gate 69 flows to the aeration tank 10 through conduit 66. Sludge discharged into the trough on the other side of the gate is discharged to waste through pipe 70.

When the traveling airlift is adapted to travel at a rate of 2 feet per minute in a settling tank having a trough 21 feet in length, sludge setling on any square foot of accumulation area 41 will be removed once in each 12 minute period. When the volume of sludge movable per unit of time by the traveling airlift and the volume of the accumulation channel are properly coordinated, the period during which the sludge is not under aeration, i.e., from the time sludge enters the settling tank in the form of mixed liquor and returns to the aeration tank as a sludge concentrate available for mixing with influent sewage at the aerator intake, may be of the order of 15 to 30 minutes.

The sludge removal as described previously dealt with use of a traveling airlift. If the intake of the mechanical surface aerator and the sludge piping outlet are positioned so that the aerator can act as a low lift pump, the channel from which the sludge concentrate feeds may be elevationally positioned so that the normal operating surface level of liquid in the channel may be below the normal surface level of liquid in the sludge separation or settling tank and as a consequence a movable siphon may be substituted for a traveling airlift.

When utilizing a movable siphon, the priming to make the flow of sludge controllable and automatic requires provision for a temporary by-pass piping connection between the siphon and the conduit for moving sludge from the channel to the aeration tank. Such a by-pass arrangement would require installation of valves at the outlet to the siphon pipe and at the inlet to the conduit and hose bib-valves on the siphon pipe and on the conduit. When it is desired to operate such a siphon, a hose connection is positioned in communication with the bib-valves and the bib-valves opened while the other valves are closed. When the surface aerator is operating and the hose connection is in position, the low lift pumping action of the aerator will initiate flow of sludge through the siphon following which the bib-valves can be closed, the hose disconnected and the main valves opened for normal operation. When the turbine is not running, the flow in the conduit will reverse until the liquid level in the channel reaches the same elevational level as the liquid in the aeration tank or the valve on the inlet to the conduit is closed. One advantage of siphon operation is the elimination of blowers to provide a source of compressed air to operate an airlift type pumping system.

In the embodiment of the invention illustrated in FIGS. 5 and 6, the numeral 75 indicates a tank of suitable material of construction. Influent sewage flows to tank 75 through channel 76 which communicates with inlet conduits 77, 78 and 79 whose outlets 77a, 78a and 79a are positioned below surface aerators, 80, 81 and 82, respectively. Surface aerators 80, 81 and 82 may be similar to aerator 13 described in conjunction with FIGS. 1 through 4, which has a partially submerged rotor and an axial inlet positioned in close proximity to the surface of the liquid. Inlet conduits 77, 78 and 79 are adapted with flow control vlaves 83, 84 and 85, respectively.

Tank 75 is provided with outlet equipped end wall 86 and outlet equipped side wall 87. End wall 86 is adapted with an overflow weir 88, preferably adjustable, or suitable ports which admit aerated mixed liquor to a channel 89. Channel 89 conducts the discharged aerated mixed liquor to separation tank 90.

Channel 89 is provided with means 91 for shutting off flow through channel such as a gate which divides the channel into segments 89a and 89b.

Side wall 87 is adapted with an overflow weir 92 or suitable ports, which may be positioned at an elevation higher than the weir 88 for a purpose hereinafter made clear. Overflow weir 92 admits aerated mixed liquor to a channel 93 which connects with channel 89b. Channel 93 is provided with means 94 for shutting off liquid flow therethrough such as a gate.

Separation tank 90 is provided with a sump 95 equipped with a drawoff pipe 96. Sludge accumulated in the bottom of tank 90 is moved to sump 95 by suitable scraper means 99, such as a continuous chain which supports scraper blades. Pipe 96 communicates with suitable means 97 such as a pump, for moving a sludge concentrate. Pump 97 discharges sludge through pipe 98 to a sludge holding tank 100. Pipe 98 is provided with branch 98a adapted to discharge sludge to waste. An alternative arrangement for handling mixed liquor to settle sludge and recycle at least a portion of the sludge to the aeration zone is to maintain a liquid level in the settling zone creating a gravity driving force for movement of sludge through the holding zone to the aeration zone, i.e., elimination of pumping between the settling tank and holding tank. To create such a hydraulic head, i.e., gravity driving force, requires that liquid level in the settling tank must create a hydraulic head sufficient to overcome all frictional forces encountered in flowing sludge concentrate from the settling tank back to the aeration tank.

Sludge holding tank 100 may be adapted with suitable means for keeping the sludge in suspension while in said holding zone. The means may be a mechanical mixer or gas dispersers. Introducing air serves the additional purpose of keeping the microorganisms in an aerated active state.

Holding tank 100 is adapted with a liquid outlet 102. However, if agitation is used to maintain the contents of the holding zone homogeneous, the drawoff point for material to be transferred to the aeration tank may be at any point below the liquid level normally maintained in the holding tank. A conduit 103 communicating with the interior of tank 100 through outlet 102 is adapted by conduit branches 104, 105 and 106 to deliver sludge concentrate from holding tank 100 to the vicinity of the inlet to aerators 80, 81 and 82, respectively, through outlets 104a, 105a and 106a, respectively. Conduit branches 104, 105 and 106 are adapted with flow control valves 107, 108 and 109, respectively.

The equipment illustrated in FIGS. 5 and 6 can, by the intercontrol of gates 91 and 94 and the valves 83, 84 and 85 on the sewage inlet conduits and the valves 107, 108 and 109 on the sludge return conduits, have the liquid flow therethrough rearranged rapidly to shift the processing from one to the other of such proesses as, for example, a conventional activated sludge process, a stepped aeration process, a "so-called" complete mixing process and a contact stabilization process.

When operating a conventional activated sludge process in this equipment having a continuous longitudinal path of flow travel for waste material, surface aerators 80, 81 and 82 are activated. Valves 83 and 102 are opened so that influent sewage and recycle sludge can flow to the inlet of surface aerator 80 adjacent the head end of the aeration tank. Valves 84, 85, 108 and 109 remain closed. Gate 94 is shut and gate 91 is opened so that aerated mixed liquor discharges through weir 88 and flows through channel 89 to separation tank 90. Sludge concentrate is pumped from separation tank 90 to holding tank 100 and then is moved by the hydraulic head differential being maintained between the liquid level in the holding tank and the aeration tank to the vicinity of the inlet to surface aerator 80.

To change the sewage processing to operate as a stepped aeration process, i.e., an activated sludge type, in which additional supplies of waste material are introduced at longitudinally spaced points along the path of longitudinal flow travel from the head end to the rear end of the aeration tank, valve 83 may or may not remain open. Valves 84 and 85 are opened to an extent providing desired proportioning of the influent sewage being mixed into the aerated mixed liquor at spaced intervals. Valves 108 and 109 remain closed so that recycle sludge is only introduced at surface aerator 80 and gate 94 remains closed so that outflow from aeration tank 75 is over weir 88 and through channel 89 to separation tank 90. Recycle of sludge is the same as when operating an activated sludge type process.

To change the sewage process from a stepped aeration process to a "cross-flow" process, i.e., to a process in which the first step is aeration in an aeration zone of the continuous liquid flow type having a flow path in the direction of the shortest axis of said zone and in which agitation maintains the content of said zone substantially homogeneous, requires the opening of all six valves so that recycle sludge is incorporated into the material passing through all three surface aerators. If desired, the influent sewage channel may be provided with longitudinally spaced overflow weirs permitting supplemental amounts of sewage to be admitted with uniform distribution to the aeration tank. Then, gate 91 is closed or the adjustable weir 88 raised to shut off liquid flow so that the liquid level in tank 75 buids up to the point where aerated mixed liquor overflows, for example, a weir 92 and flows through channels 93 and 89b to separation tank 90. Sludge concentrated in separation tank 90 is recycled to aeration tank 75 in the same manner as previously described.

To change the "cross-flow" process to a contact stabilization process requires the closing of valves 83 and either 84 or 85 on the influent sewage lines. Valves 108 and 109 on the recycle sludge lines are closed. Gate 94 in channel 93 is closed and gate 91 is opened, so that outflow of aerated mixed liquor is through weir 88 and channel 89 to separation tank 90. The effect of such changes is that a mixed liquor enriched with sludge and oxygen is discharged by surface aerator 80 and influent sewage is mixed into the aerated-sludge enriched mixed liquor by surface aerators 81 or 82.

Figure 2:
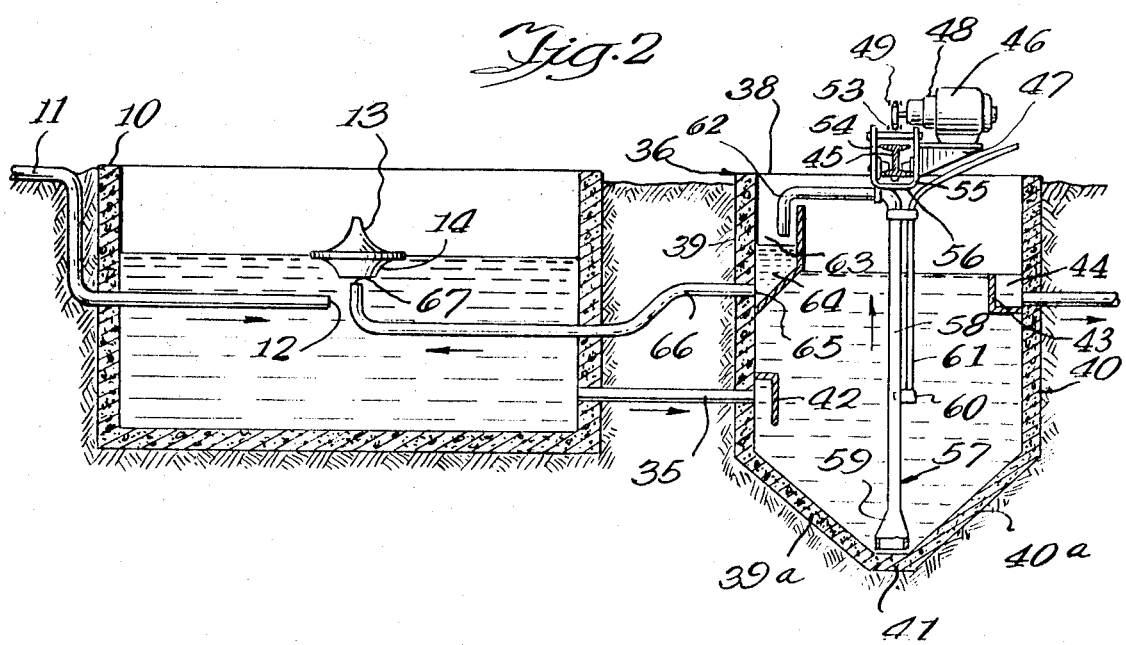
FIG. 2 is a side elevational view of the apparatus of FIG. 1.

When sewage is to be treated in the equipment illustrated in FIGS. 1 and 2, at a design rate of 100,000 gallons of raw sewage per day, the volume of mixed liquor in the aeration tank will be 1660 cubic feet with an average loading rate of 100 pounds of B.O.D. per 1000 cubic feet of aeration tank volume per day.

Raw sewage may enter tank 10 at an average introduction rate of 70 gallons per minute. Recycle sludge may enter tank 10 at an average introduction rate of 70 gallons per minute.

Positioning of the outlet 12 for the raw sewage and the outlet 67 for the recycle pipe within 24 inches of the intake of a rotor 14 of 39 inches in diameter rotating at 84 r.p.m. will insure that the raw sewage and recycle sludge in these volumes are taken in, mixed and discharged through the guide channels as aerated mixed liquor without allowing any of the material being introduced to short circuit or mix with the tank contents independent of the rotor mixing action.

Discharge of mixed liquor to a final settling tank having a capacity of 10,000 gallons is under a baffle which provides for distribution of the solids relative to the settling tank floor. Effluent separated in this final tank is discharged at a rate of 100,000 gallons per day. The effluent will have less than 30 mg. per liter of B.O.D. Sludge removed from adjacent the bottom of the final settling tank by the airlift pump may be discharged at a rate of about 70 gallons per minute having a solids concentration of 0.6% by weight. 20 gallons per minute of this sludge are discharged to waste and the balance returned to the aeration tank.

The above-detailed description of this invention has been given by way of illustration without any intention that the invention be limited to the exact conditions set forth. No unnecessary limitations should be understood therefrom, as modifications will be obvious to those skilled in the art.

I claim:

1. The process for treating waste materials which comprises establishing a mixed liquor in an aeration zone, dispersing oxygen in the contents of the aeration zone by the action of a surface aerator adapted to mix atmospheric air into liquid entering said aerator from below through a substantially axial inlet and discharge the mixture in a radial direction, introducing influent waste material in the vicinity of and elevationally below said axial inlet, discharging mixed liquor containing sludge solids to a solids separation zone, concentrating said sludge solids, removing said concentrated sludge solids from said separation zone and introducing said solids into a holding zone, flowing solids from said holding zone at least partially in response to gravity to an area in the vicinity of and elevationally below said axial inlet whereby influent waste material and sludge immediately enter said rotor for mixing and aerating and discharging clarified effluent from the separation zone.

2. The process according to claim 1 wherein sludge solids are removed progressively and sequentially from the bottom of said settling zone for discharge to said holding zone.

3. The process according to claim 1 wherein the liquid head differential for flowing of sludge from said holding zone is provided by suction generated by said aerator.

4. The process according to claim 1 wherein the settled sludge removed from said separation zone is split during delivery to said holding zone so that one portion flows to said aeration zone and the remainder is discharged to waste.

5. The process according to claim 1 wherein said settled solids are introduced to a holding zone elevationally positioned to provide a liquid level in said holding zone above the liquid level in said aeration zone and sludge flows to said aeration zone from said holding zone by gravity.

6. A method of the activated sludge type for treating waste materials in which the first step is aeration in an aeration zone of the continuous liquid flow type having a flow path in the direction of the shortest axis of said zone and in which agitation maintains the contents of said zone substantially homogeneous which comprises establishing a mixed liquor in an aeration zone, dispersing oxygen in the contents of the aeration zone by the action of a multiplicity of longitudinally spaced surface aerators adapted to mix atmospheric air into liquid entering said aerators from below through a substantially axial inlet and discharge the mixture in a radial direction, introducing influent waste material in the vicinity of and elevationally below each of said aerators, discharging mixed liquor containing sludge solids from said aeration zone along a side extending longitudinally of said aeration zone, concentrating said sludge solids, discharging a sludge concentrate from said separation zone and introducing said solids into a holding zone, flowing solids from said holding zone at least partially in response to gravity in the area in the vicinity of and elevationally below said aerators whereby influent waste material and sludge immediately enter said aerators for mixing and aerating, and discharging clarified effluent from the separation zone.

7. A method of the activated sludge type for treating waste materials in which the first step is aeration in an aeration zone of the continuous flow type having a continuous longitudinal path for flow travel of waste material which comprises establishing a mixed liquor in said aeration zone, dispersing oxygen in the contents of the aeration zone by the action of a multiplicity of longitudinally spaced surface aerators adapted to mix atmospheric air into liquid entering said aerator from below and discharge the mixture in a radial direction, introducing influent waste material in the vicinity of and elevationally below said surface aerator adjacent the head end of said aeration tank and introducing additional supplies of waste material in the vicinity of and below the additional surface aerators positioned along the path of flow travel from the head and to the rear end of said tank, discharging mixed liquor containing sludge solids from said aeration zone at the end of the path of flow travel to a solids separation zone, concentrating said sludge solids, discharging clarified effluent from said separation zone, removing concentrated sludge solids from said separation zone to a sludge holding zone, flowing solids from said holding zone at least partially in response to gravity in an area in the vicinity of and elevationally below said surface aerator adjacent the head end of said aeration zone.

8. A method for treating waste materials in which the first step is aeration in an areation zone of the continuous flow type having a continuous longitudinal path for flow travel of waste material which comprises establishing a mixed liquor in said aeration zone, dispersing oxygen in the contents of the aeration zone by the action of a multiplicity of longitudinally spaced surface aerators adapted to mix atmospheric air into liquid entering said aerator from below and discharge the mixture in a radial direction, introducing proportioned quantities of influent waste material in the vicinity of and elevationally below surface aerators removed from the head end of said aeration tank, discharging mixed liquor containing sludge solids from said aeration zone at the end of the path of flow travel to a solids separation zone, concentrating said sludge solids, discharging clarified effluent from said separation zone, removing concentrated sludge solids from said separation zone to a sludge holding zone, flowing solids from said holding zone at least partially in response to gravity in the area in the vicinity of and elevationally below said surface aerator adjacent the head end of said aeration zone.

9. A method of the activated sludge type for treating waste materials in which the first step is aeration in an aeration zone of the continuous liquid flow type having continuous longitudinal path of flow travel for waste material which comprises establishing a mixed liquor in an aeration zone, dispersing oxygen in the contents of said aeration zone by the action of the multiplicity of longitudinally spaced surface aerators adapted to mix atmospheric air into liquid entering said aerators from below and discharge the mixture in a radial direction, introducing influent waste material in the vicinity of and elevationally below at least one of the surface aerators spaced from the aerator adjacent the head end of said aeration zone, discharging mixed liquor containing sludge solids from said aeration zone at the end of path of flow travel to a solids separation zone, concentrating said sludge solids, discharging effluent from said zone, removing said concentrated sludge solids from said aeration zone to a sludge holding zone, flowing solids from said holding zone at least partially in response to gravity to an area in the vicinity of and elevationally below said axial inlet of the surface aeration adjacent the head end of said aeration zone.

10. Apparatus for the treatment of waste materials which comprises an aeration tank, a surface aerator for introducing air into liquid passing therethrough which in use is at least partially submerged in the liquid in said tank and revolves about a substantially vertical axis, conduit means for directing influent sewage to an area in the vicinity of and elevationally below the inlet to said surface aerator, a sludge separation tank, liquid flow transfer means connecting said aeration tank to said sludge separation tank, means for collecting sludge settled in the separation tank bottom and transferring said sludge into a sludge accumulation channel, means for discharging clarified liquid from said separation tank, means communicating with the bottom of said sludge channel for directing flow of sludge accumulated in said channel to an area in the vicinity of and elevationally below the inlet to said rotor.

11. Apparatus according to claim 10 wherein said means for collecting said sludge and transferring it to said sludge accumulation channel is a conduit positioned in an upright position movable lengthwise of said sludge separation tank with its inlet adjacent the separation tank bottom and having an outlet positioned to discharge into said channel and said conduit means is provided with tubular means communicating with the interior of said conduit and with a source of air under pressure whereby airlift type pumping is effected.

12. Apparatus according to claim 10 wherein said channel is elevationally positioned so that the normal operating liquid level therein is below the normal liquid level in said separation tank and said means for transferring settled sludge to said channel is a siphon pipe.

13. Apparatus according to claim 10 wherein said channel is elevationally positioned so that the normal operating liquid level therein is above the liquid level in said aeration tank.

14. Apparatus according to claim 10 wherein said channel is provided with means partitioning it into two segments, one segment communicating with said aeration tank for sludge flow by said piping means and the second segment being provided with an outlet for discharge of sludge to waste.

15. Apparatus according to claim 10 wherein said partially submerged rotor has the axial inlet thereto positioned in close proximity to the surface of the liquid in said aeration tank.

16. Apparatus for the treatment of waste materials which comprises an aeration tank, a plurality of surface aerators having a rotor for introducing air into liquid passing therethrough which in use is at least partially submerged and revolves about a substantially vertical axis, said rotor having a number of guide channels for the liquid formed between vanes curved in their vertical plane so as to deflect liquid entering from below through a substantially axial inlet outwards in a substantially horizontal direction, spaced longitudinally in said aeration tank, conduit means for directing influent sewage to an area in the vicinity of and elevationally below the inlet to each rotor, flow control means associated with said conduit means, a sludge separation tank, liquid flow transfer means connecting said aeration tank to said sludge separation tank, said liquid flow transfer means being arranged to receive liquid discharged along one longitudinal side of the aeration tank and along the end of said aeration tank, means associated with said liquid flow transfer means for independently controlling flow through the means along one longitudinal side and along the end of said aeration tank, means for collecting sludge settled in the separation tank and transferring said sludge through a sludge holding tank to said aeration tank, the liquid level in said settling and holding tanks providing a hydraulic head for movement of at least part of the concentrated sludge to said aeration tank, means for discharging clarified liquid from said separation tank, piping means communicating with said sludge holding tank for directing flow of sludge therefrom to an area in the vicinity of and elevationally below the inlet to each of said rotors and flow control means associated with each of said piping means.

References Cited

UNITED STATES PATENTS

| | | | |
|---|---|---|---|
| 2,090,384 | 8/1937 | Durdin | 210—197 |
| 2,186,371 | 1/1940 | Durdin | 210—44 |
| 3,295,682 | 1/1967 | Schramm | 210—256X |
| 3,396,102 | 8/1968 | Forrest | 210—195X |

MICHAEL ROGERS, Primary Examiner

U.S. Cl. X.R.

210—15, 195, 257, 527; 261—91